US011829762B2

(12) United States Patent
Tran

(10) Patent No.: US 11,829,762 B2
(45) Date of Patent: *Nov. 28, 2023

(54) TIME-RESOURCE MATRIX FOR A MICROPROCESSOR WITH TIME COUNTER FOR STATICALLY DISPATCHING INSTRUCTIONS

(71) Applicant: Simplex Micro, Inc., San Jose, CA (US)

(72) Inventor: Thang Minh Tran, Tustin, CA (US)

(73) Assignee: Simplex Micro, Inc., Austin, TX (US)

( * ) Notice: Subject to any disclaimer, the term of this patent is extended or adjusted under 35 U.S.C. 154(b) by 22 days.

This patent is subject to a terminal disclaimer.

(21) Appl. No.: 17/697,865

(22) Filed: Mar. 17, 2022

(65) Prior Publication Data
US 2023/0244489 A1 Aug. 3, 2023

Related U.S. Application Data

(63) Continuation-in-part of application No. 17/588,315, filed on Jan. 30, 2022.

(51) Int. Cl.
*G06F 9/38* (2018.01)
*G06F 9/30* (2018.01)
*G06F 9/32* (2018.01)
*G06F 9/50* (2006.01)

(52) U.S. Cl.
CPC .......... *G06F 9/321* (2013.01); *G06F 9/30145* (2013.01); *G06F 9/3838* (2013.01); *G06F 9/5038* (2013.01)

(58) Field of Classification Search
CPC .......................... G06F 9/3836; G06F 9/30145
See application file for complete search history.

(56) References Cited

U.S. PATENT DOCUMENTS

| 5,185,868 A | 2/1993 | Tran |
| 5,251,306 A | 10/1993 | Tran |
| 5,655,096 A | 8/1997 | Branigin |
| 5,699,536 A | 12/1997 | Hopkins et al. |
| 5,802,386 A | 9/1998 | Kahle et al. |

(Continued)

FOREIGN PATENT DOCUMENTS

| EP | 0840213 A2 | 5/1998 |
| EP | 0959575 A1 | 11/1999 |
| WO | 0010076 A1 | 2/2000 |

OTHER PUBLICATIONS

Choi, W., Park, SJ., Dubois, M. (2009). Accurate Instruction Prescheduling in Dynamically Scheduled Processors. In: Stenström, P. (eds) Transactions on High-Performance Embedded Architectures and Compilers I. Lecture Notes in Computer Science, vol. 5470 Springer, Berlin, Heidelberg. pp. 107-127. (Year: 2009).

(Continued)

*Primary Examiner* — Zachary K Huson
(74) *Attorney, Agent, or Firm* — Appleton Luff

(57) ABSTRACT

A processor includes a time counter and a time-resource matrix and provides a method for statically dispatching instructions if the resources are available based on data stored in the time-resource matrix, and wherein execution times for the instructions use a time count from the time counter to specify when the instructions may be provided to an execution pipeline.

24 Claims, 5 Drawing Sheets

(56) References Cited

U.S. PATENT DOCUMENTS

| | | |
|---|---|---|
| 5,809,268 A | 9/1998 | Chan |
| 5,835,745 A | 11/1998 | Sager et al. |
| 5,860,018 A | 1/1999 | Panwar |
| 5,881,302 A | 3/1999 | Omata |
| 5,958,041 A | 9/1999 | Petolino, Jr. et al. |
| 5,961,630 A | 10/1999 | Zaidi et al. |
| 5,964,867 A | 10/1999 | Anderson et al. |
| 5,996,061 A | 11/1999 | Lopez-Aguado et al. |
| 5,996,064 A | 11/1999 | Zaidi et al. |
| 6,016,540 A | 1/2000 | Zaidi et al. |
| 6,035,393 A | 3/2000 | Glew et al. |
| 6,065,105 A | 5/2000 | Zaidi et al. |
| 6,247,113 B1 | 6/2001 | Jaggar |
| 6,304,955 B1 | 10/2001 | Arora |
| 6,425,090 B1 | 7/2002 | Arimilli et al. |
| 6,453,424 B1 | 9/2002 | Janniello |
| 7,069,425 B1 | 6/2006 | Takahashi |
| 7,434,032 B1 | 10/2008 | Coon et al. |
| 8,166,281 B2 | 4/2012 | Gschwind et al. |
| 9,256,428 B2 | 2/2016 | Heil et al. |
| 11,132,199 B1 | 9/2021 | Tran |
| 11,144,319 B1 | 10/2021 | Battle et al. |
| 11,163,582 B1 | 11/2021 | Tran |
| 11,204,770 B2 | 12/2021 | Tran |
| 11,263,013 B2 | 3/2022 | Tran |
| 2003/0135712 A1 | 7/2003 | Theis |
| 2006/0095732 A1 | 5/2006 | Tran et al. |
| 2006/0218124 A1 | 9/2006 | Williamson et al. |
| 2006/0259800 A1 | 11/2006 | Maejima |
| 2006/0288194 A1* | 12/2006 | Lewis ............... G06F 9/3869 712/220 |
| 2007/0260856 A1 | 11/2007 | Tran et al. |
| 2011/0099354 A1 | 4/2011 | Takashima et al. |
| 2013/0151816 A1 | 6/2013 | Indukuru et al. |
| 2013/0346985 A1* | 12/2013 | Nightingale ........ G06F 15/7871 718/102 |
| 2014/0082626 A1* | 3/2014 | Busaba ............... G06F 9/45533 718/104 |
| 2015/0227369 A1 | 8/2015 | Gonion |
| 2016/0092238 A1 | 3/2016 | Codrescu et al. |
| 2016/0371091 A1 | 12/2016 | Brownscheidle et al. |
| 2017/0357513 A1 | 12/2017 | Ayub et al. |
| 2018/0196678 A1 | 7/2018 | Thompto |
| 2020/0004543 A1 | 1/2020 | Kumar et al. |
| 2021/0026639 A1 | 1/2021 | Tekmen et al. |

OTHER PUBLICATIONS

Diavastos, Andreas & Carlson, Trevor. (2021). Efficient Instruction Scheduling using Real-time Load Delay Tracking. (Year: 2021).

J. S. Hu, N. Vijaykrishnan and M. J. Irwin, "Exploring Wakeup-Free Instruction Scheduling," 10th International Symposium on High Performance Computer Architecture (HPCA'04), Madrid, Spain, pp. 232-232 (Year: 2004).

Written Opinion of the International Searching Authority, PCT/S2022/052185.

Written Opinion of the International Searching Authority, PCT/US2023/018970.

Written Opinion of the International Searching Authority, PCT/US2023/018996.

* cited by examiner

TIME-RESOURCE MATRIX FOR A MICROPROCESSOR WITH TIME COUNTER FOR STATICALLY DISPATCHING INSTRUCTIONS

RELATED APPLICATIONS

This application claims priority to and is a continuation-in-part of U.S. patent application Ser. No. 17/588,315, filed Jan. 30, 2022, and entitled "Microprocessor with Time Counter for Statically Dispatching Instructions," which application is hereby incorporated by reference in its entirety.

BACKGROUND

Technical Field

The present invention relates to the field of computer processors. More particularly, it relates to issuing and executing instructions based on a time count in a processor where the processor consists of a general-purpose microprocessor, a digital-signal processor, a single instruction multiple data processor, a vector processor, a graphics processor, or other type of microprocessor which executes instructions.

Technical Background

Processors have become increasingly complex chasing small increments in performance at the expense of power consumption and semiconductor chip area. The approach in out-of-order (OOO) superscalar microprocessors has remained basically the same for the last 25-30 years, with much of the power dissipation arising from the dynamic scheduling of instructions for execution from the reservation stations or central windows. Designing an OOO superscalar microprocessor is a huge undertaking. Hundreds of instructions are issued to the execution pipeline where the data dependencies are resolved and arbitrated for execution by a large number of functional units. The result data from the functional units are again arbitrated for the write buses to write back to the register file. If the data cannot be written back to the register file, then the result data are kept in temporary registers and a complicated stalling procedure is performed for the execution pipeline.

An alternative to OOO superscalar processors is very-long-instruction-word (VLIW) processors. These have diminished interest in the industry because of the need for a complex compiler and relatively weak performance.

Thus, there is a need for an OOO superscalar microprocessor which consumes less power, has a simpler design, and is scalable with consistently high performance.

SUMMARY

The disclosed embodiments provide a processor with a time counter and a method for statically dispatching instructions to an execution pipeline with preset execution times based on a time count from the counter.

A disclosed approach to microprocessor design employs static scheduling of instructions. A static scheduling algorithm is based on the assumption that a new instruction has a perfect view of all previous instructions in the execution pipeline, and thus it can be scheduled for execution at an exact time in the future, e.g., with reference to a time count from a counter. Assuming an instruction has 2 source operands and 1 destination operand, the instruction can be executed out-of-order when conditions are met of (1) no data dependency, (2) availability of read buses to read data from the register file, (3) availability of a functional unit to execute the instruction, and (4) availability of a write bus to write result data back to the register file.

All the above requirements are associated with time: (1) a time when all data dependencies are resolved, (2) at which time the read buses are available to read source operands from a register file, (3) at which subsequent time the functional unit is available to execute the instruction, and (4) at which further subsequent time the write bus is available to write result data back to the register file. A time-resource matrix in a microprocessor may be logically organized as a number of rows, one row corresponding to a time count of the counter, with each row divided into a number of columns, one for each resource. In such an organization, the values in the columns represent the counts for each resource to indicate how many resources have been used by previous instructions in the execution pipeline.

In one embodiment a time counter increments periodically, for example, every clock cycle, and the resulting count is used to statically schedule instruction execution. Instructions have known throughput and latency times, and thus can be scheduled for execution based on the time count. For example, an add instruction with throughput and latency time of 1 can be scheduled to execute when any data dependency is resolved. If the time count is 5 and the add has no data dependency at time 8, then the available read buses are scheduled to read data from the register file at time 8, the available arithmetic logic unit (ALU) is scheduled to execute the add instruction at time 9, and the available write bus is scheduled to write result data from ALU to the register file at time 9. The read buses, the ALUs, and the write buses are the resources represented in the time-resource matrix. After the add instruction is issued, the number of available read buses at time 8 is reduced by the number of valid source registers of the add instruction, the number of available ALUs at time 9 is reduced by 1, and the number of available write buses at time 9 is reduced by 1 for valid destination register of the add instruction. The add instruction is dispatched to the ALU execution queue with the preset execution times. The aforementioned resource availability adjustment results in subsequent instructions with a read time of 8 seeing fewer read buses, similarly for the ALU and the write buses at time 9. In one embodiment, the count value of a resource is an exact resource number to be used for the issued instruction. For example, if the number of write buses is 5, then the resource count of 0 indicates that the first write bus is used for the issue instruction. The resource count for the write buses is incremented by 1 and the next instruction uses the second write bus.

The maximum time count is designed to accommodate the largest future time to schedule execution of instruction. In some embodiments, the time count is 64 and thus no instruction can be scheduled to execute more than 64 cycles in the future. In another embodiment a superscalar microprocessor with quad-issue can have 256 instructions in the execution pipeline. With static scheduling of instructions based on the time count, the complexity of dynamic scheduling is eliminated, the arbitration of resources is reduced, and the hundreds of comparators for checking data dependencies are eliminated. The basic out-of-order execution of instructions can be the same, but statically scheduling of instructions with a time count is more efficient. The elimination of the extra components means the processor consumes less power. Instructions are efficiently executed outof-order with preset times to retain the performance compared to traditional dynamic approaches. The number of issued instructions is scalable from scalar to superscalar.

In one embodiment a processor includes a time counter which stores a time count incremented every clock cycle representing a current time of the processor, a time-resource matrix to indicate what resources are available at every time count, an instruction issue unit for receiving a first instruction and issuing the first instruction with a preset execution time based on the time count and the availability of the needed resources, and an execution queue for receiving the first instruction from the instruction unit and dispatching the first instruction to a functional unit when the preset execution time is the same as the time count.

BRIEF DESCRIPTION OF THE DRAWINGS

Aspects of the present invention are best understood from the following description when read with the accompanying figures.

DETAILED DESCRIPTION

Figure 1:
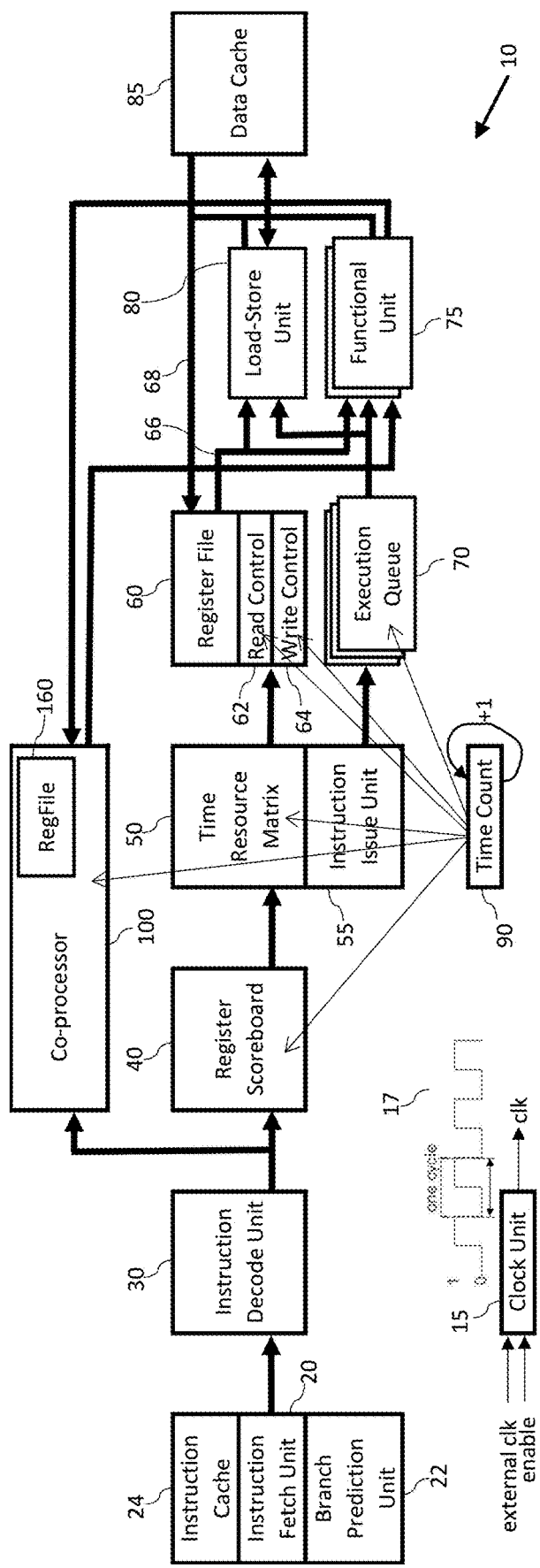
FIG. 1 is a block diagram illustrating a processor based data processing system in accordance with present invention.

The following description provides different embodiments for implementing aspects of the present invention. Specific examples of components and arrangements are described below to simplify the explanation. These are merely examples and are not intended to be limiting. For example, the description of a first component coupled to a second component includes embodiments in which the two components are directly connected, as well as embodiments in which an additional component is disposed between the first and second components. In addition, the present disclosure repeats reference numerals in various examples. This repetition is for the purpose of clarity and does not in itself require an identical relationship between the embodiments.

In one embodiment a processor is provided, typically implemented as a microprocessor, that schedules instructions to be executed at a preset time based on a time count from a time counter. In such a microprocessor the instructions are scheduled to be executed using the known throughput and latency of each instruction to be executed. For example, in one embodiment, the ALU instructions have throughput and latency times of 1, the multiply instructions have throughput time of 1 and a latency time of 2, the load instructions have the throughput time of 1 and a latency time of 3 (based on a data cache hit), and the divide instruction have throughput and latency times of 32.

FIG. 1 is a block diagram of a microprocessor based data processing system. The exemplary system includes a microprocessor 10 having an instruction fetch unit 20, an instruction cache 24, a branch prediction unit 22, an instruction decode unit 30, a register scoreboard 40, a time-resource matrix 50, an instruction issue unit 55, a register file 60, a read control unit 62, a write control unit 64, a plurality of execution queues 70, a plurality of functional units 75, a load-store unit 80, a data cache 85, and a co-processor 100. The microprocessor 10 includes a plurality of read buses 66 coupling the register files to the functional units 75 and load-store unit 80. The system also includes a plurality of write buses 68 to write result data from the functional unit 75, the load-store unit 80, and the data cache 85 to the register file 60. The microprocessor 10 is a synchronous microprocessor where the clock unit 15 generates a clock signal ("clk") which couples to all the units in the microprocessor 10. The clock unit 15 provides a continuously toggling logic signal 17 which toggles between 0 and 1 repeatedly at a clock frequency. Clock output signal ("clk") of clock unit 15 enables synchronizing many different units and states in the microprocessor 10. The clock signal is used to sequence data and instructions through the units that perform the various computations in the microprocessor 10. The clock unit 15 may include an external clock as an input to synchronize the microprocessor 10 with external units (not shown). The clock unit 15 may further receive an enable signal to disable the clock unit when the microprocessor is in an idle stage or otherwise not used for instruction execution.

According to an embodiment the microprocessor 10 also includes a time counter unit 90 which stores a time count incremented, in one embodiment, every clock cycle. The time counter unit 90 is coupled to the clock unit 15 and uses "clk" signal to increment the time count. In one embodiment the time count represents the time in clock cycles when an instruction in the instruction issue unit 55 is scheduled for execution. For example, if the current time count is 5 and an instruction is scheduled to be executed in 22 cycles, then the instruction is sent to the execution queue 70 with the execution time count of 27. When the time count increments to 26, the execution queue 70 issues the instruction to the functional unit 75 for execution in next cycle (time count 27). The time counter unit 90 is coupled to the register scoreboard 40, the time-resource matrix 50, the read control 62, the write control 64, and the plurality of execution queues 70.

The scoreboard 40 resolves data dependencies in the instructions. The time-resource matrix 50 checks availability of the various resources which in one embodiment include the read buses 66, the functional units 75, the load-store unit 80, and the write buses 68. The read control unit 62, the write control unit 64, and the execution queues 70 receive the corresponding scheduled times from the instruction issue unit 55. The read control unit 62 is set to read the source operands from the register file 60 on specific read buses 66 at a preset time. The write control unit 64 writes the result data from a functional unit 75 or the load-store unit 80 or the data cache 85 to the register file 60 on a specific write bus 68 at a preset time discussed below. The execution queue 70 is set to dispatch an instruction to a functional unit 75 or the load-store unit 80 at a preset time. In each case, the preset time is the time setup by the instruction decode unit 30. The preset time is a future time based on the time count, so when the time count counts up to the future preset time, then the specified action will happen, where the specified action is reading data from the register file 60, writing data to the register file 60, or issuing an instruction to a functional unit 75 for execution. The instruction decode unit 30 determines that the instruction is free of any data dependency. The resource is available to set the "preset time" for the instruction to be executed in the execution pipeline.

In the microprocessor system 10, the instruction fetch unit 20 fetches the next instruction(s) from the instruction cache 24 to send to the instruction decode unit 30. One or more instructions can be fetched per clock cycle from the instruction fetch unit depending on the configuration of microprocessor 10. For higher performance, an embodiment of microprocessor 10 fetches more instructions per clock cycle for the instruction decode unit 30. For low-power and embedded applications, an embodiment of microprocessor 10 might fetch only a single instruction per clock cycle for the instruction decode unit 30. If the instructions are not in the instruction cache 24 (commonly referred to as an instruction cache miss), then the instruction fetch unit 20 sends a request to external memory (not shown) to fetch the required instructions. The external memory may consist of hierarchical memory subsystems, for example, an L2 cache, an L3 cache, read-only memory (ROM), dynamic random-access memory (DRAM), flash memory, or a disk drive. The external memory is accessible by both the instruction cache 24 and the data cache 85. The instruction fetch unit is also coupled with the branch prediction unit 22 for prediction of the next instruction address when the branch is detected and predicted by the branch prediction unit 22. The instruction fetch unit 20, the instruction cache 24, and the branch prediction unit 22 are described here for completeness of a microprocessor 10. In other embodiments, other instruction fetch and branch prediction methods can be used to supply instructions to the instruction decode unit 30 for microprocessor 10.

The instruction decode unit 30 is coupled to the instruction fetch unit 20 for new instructions, coupled to the co-processor 100, and is also coupled to the register scoreboard 40. The instruction decode unit 30 decodes the instructions for instruction type, instruction throughput and latency times, and the register operands. If the instruction is coprocessor type, then the instruction is sent to the coprocessor unit 100. The coprocessor unit 100 is another processor which can decode and execute its own instruction independent from the main CPU pipeline of microprocessor 10. The register operands, as an example, may consist of 2 source operands and 1 destination operand. The operands are referenced to registers in the register file 60. The source and destination registers are used here to represent the source and destination operands of the instruction. The source registers support solving read-after-write (RAW) data dependencies. If a later instruction has the same source register as the destination register of an earlier instruction, then the later instruction has RAW data dependency. The later instruction must wait for completion of the earlier instruction before it can start execution. The register scoreboard 40 is used to keep track of the completion time of the destination registers of the earlier instructions and hence keeps a time entry for each destination register for all pending instructions in the execution pipeline. In the preferred embodiment the completion time is maintained in reference to the time count 90.

In an embodiment, the coprocessor 100 has all the units as in the main CPU pipeline of microprocessor 10, the instruction decode unit, the register scoreboard, the time-resource matrix, the instruction issue unit, the register file, the read control unit, the write control unit, the execution queues, and the functional units. Except for the register file 160, no other unit is shown in the coprocessor 100. In one embodiment, the coprocessor 100 shares a functional unit 75 with the main CPU pipeline. The coprocessor 100 dispatches a coprocessor instruction along with source operand data from the register file 160 to the functional unit 75 and receives result data from the functional unit back to the coprocessor 100 to write to the register file 160.

Each of the units shown in the block diagram of FIG. 1 can be implemented in integrated circuit form by one of ordinary skill in the art in view of the present disclosure. With regard to one embodiment of this invention, time counter 90 is a basic N-bit wrap-around counter incrementing by 1 every clock cycle. The time-resource matrix 50 is preferably implemented as registers with entries read and written as with a conventional register structure.

The integrated circuitry employed to implement the units shown in the block diagram of FIG. 1 may be expressed in various forms including as a netlist which takes the form of a listing of the electronic components in a circuit and the list of nodes that each component is connected to. Such a netlist may be provided via an article of manufacture as described below.

In other embodiments, the units shown in the block diagram of FIG. 1 can be implemented as software representations, for example in a hardware description language (such as for example Verilog) that describes the functions performed by the units of FIG. 1 at a Register Transfer Level (RTL) type description. The software representations can be implemented employing computer-executable instructions, such as those included in program modules and/or code segments, being executed in a computing system on a target real or virtual processor. Generally, program modules and code segments include routines, programs, libraries, objects, classes, components, data structures, etc. that perform particular tasks or implement particular abstract data types. The program modules and/or code segments may be obtained from another computer system, such as via the Internet, by downloading the program modules from the other computer system for execution on one or more different computer systems. The functionality of the program modules and/or code segments may be combined or split between program modules/segments as desired in various embodiments. Computer-executable instructions for program modules and/or code segments may be executed within a local or distributed computing system. The computer-executable instructions, which may include data, instructions, and configuration parameters, may be provided via an article of manufacture including a non-transitory computer readable medium, which provides content that represents instructions that can be executed. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The aforementioned implementations of software executed on a general-purpose, or special purpose, computing system may take the form of a computer-implemented method for implementing a microprocessor, and also as a computer program product for implementing a microprocessor, where the computer program product is stored on a non-transitory computer readable storage medium and include instructions for causing the computer system to execute a method. The aforementioned program modules and/or code segments may be executed on suitable computing system to perform the functions disclosed herein. Such a computing system will typically include one or more processing units, memory, and non-transitory storage to execute computer-executable instructions.

Figure 2:
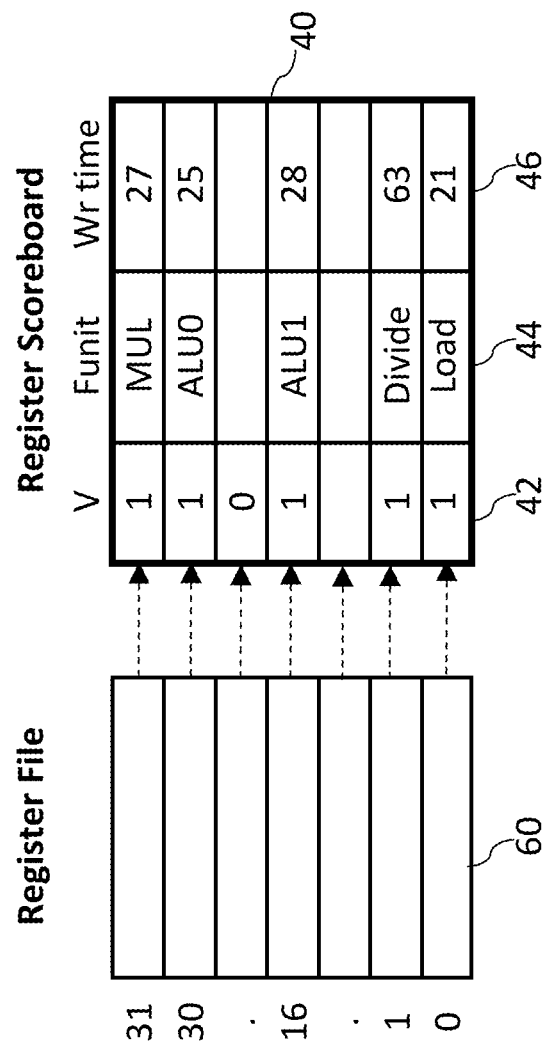
FIG. 2 is a block diagram illustrating a register file and a register scoreboard.

FIG. 2 illustrates the register file 60 and the register scoreboard 40. In one embodiment, the register file 60 has 32 registers, numbered as registers 0 to 31 as illustrated. Each register in the register file 60 has a corresponding entry in the register scoreboard 40. The register scoreboard 40 stores the pending write status for the registers 60. A valid bit field 42 indicates a valid write back to the register file 60 at a future time in reference to the time count 90, as specified by the write time field 46 from a specific functional unit in the "Funit" field 44. As examples illustrated in FIG. 2, register 0 is written back at time count 21 from the load-store unit 80. Register 1 is written back at time count 63 from the divide unit (one of the functional units 75). Register 16 is written back at time count 28 from the ALU1, (another of the functional units 75), etc. as illustrated in FIG. 2. The write time 46 is the time in reference to the time count 90. The result data is written to the register file 60. The data is not available from the register file 60 until next clock cycle, but the result data can be forwarded from the functional unit 44 in the register scoreboard 40. For example, if the value of the time count 90 is 19, then the load-store unit 80 produces the result data in 2 clock cycles for writing back to the register file 60 at time count 21.

The write time of a destination register is the read time for the subsequent instruction with RAW data dependency on the same destination register. Referring back to FIG. 1, the source registers of an instruction in the instruction decode unit 30 access the register scoreboard 40 for the read times. If the valid bit 42 of a source register is not set in the register scoreboard 40, then the data in the register file 60 and can be accessed at any time provided availability of the read buses 66, otherwise the write time 46 is the earliest time to issue the instruction.

An instruction reads source operand data at read time, executes the instruction with a functional unit 75 at execute time, and writes the result data back to the register file 60 at write time. The write time is recorded in the write time field 46 of the register scoreboard 40. With 2 source registers, the instruction selects the later write time from the register scoreboard 40 as the read time for the instruction. The execute time is the read time plus 1 time count where the functional unit 75 or the load-store unit 80 starts executing the instruction. The write time of the instruction is the read time plus the instruction latency time. If the instruction latency time is 1 (e.g., an ALU instruction), then the write time and execution time of the instruction are the same.

Each instruction has an execution latency time. For example, the add instruction has a latency time of 1, the multiply instruction has a latency time of 2, and the load instruction has a latency time of 3 assuming a data cache hit. In another example, if the current time count is 5 and the source registers of an add instruction receive write time counts of 22 and 24 from the register scoreboard 40, then the read time count is set at 24. In this case, the execution and the write time counts are both 25 for the add instruction. As shown in FIG. 1, the register scoreboard 40 is coupled to the time-resource matrix 50 where the read, execute, and write phases of an instruction access the time-resource matrix 50 for availabilities of the resources.

Figure 3:
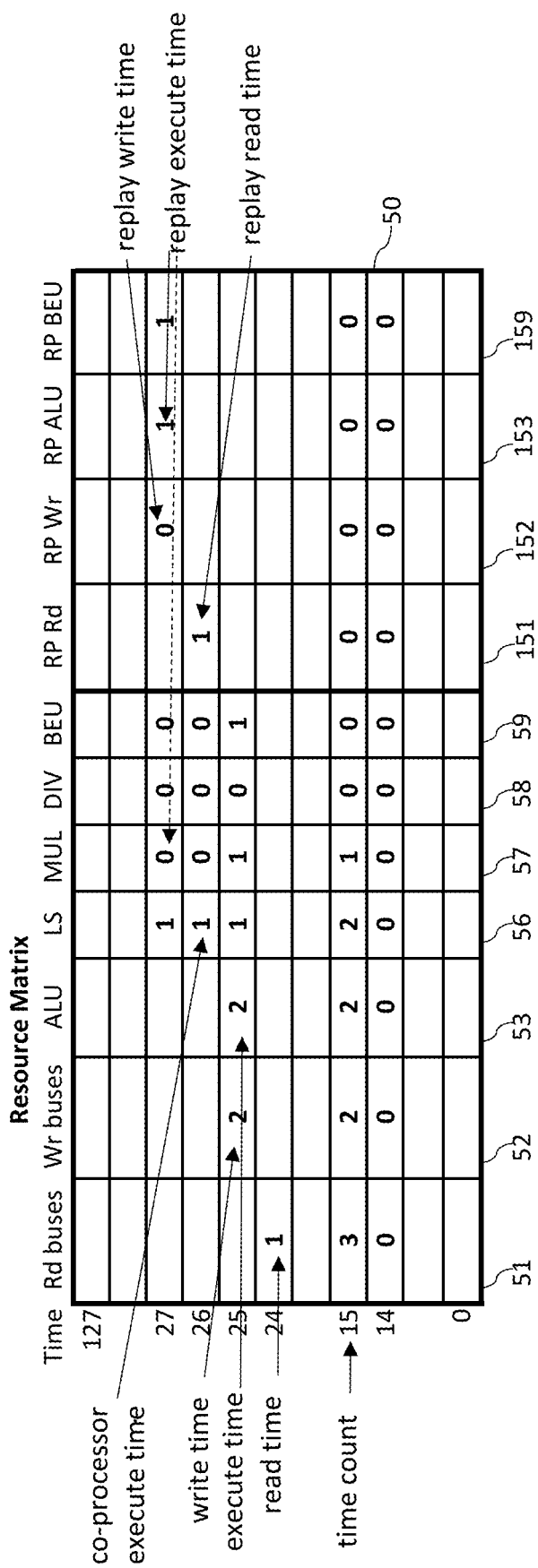
FIG. 3 is a block diagram illustrating a time-resource matrix.

FIG. 3 illustrates the time-resource matrix 50. The time-resource matrix 50 preferably includes the same number of time entries as the time counter 90. For example, if the time counter 90 returns to zero after 128 cycles, then the time-resource matrix 50 preferably has 128 entries. The time counter is incremented every clock cycle and rotates back from the 127th entry to the 0th entry. The columns in the time-resource matrix 50 represent the availability of specific resources. In the embodiment shown in FIG. 3 the time-resource matrix 50 is arranged to identify the availability of resources by identifying the resources that are busy, and specifically the read buses 51, the write buses 52, the ALUs 53, the load-store ports 56, the multiply unit 57, the divide unit 58, the branch execution unit (BEU) 59, the replay read buses 151, the replay write buses 152, the replay ALUs 153, and the replay BEU 159. These resources are an example and if other functional units are provided by microprocessor 10 those are also included in the resource matrix 50.

The read buses column 51 corresponds to the plurality of read buses 66 in FIG. 1. The write buses column 52 corresponds to the plurality of write buses 68 in FIG. 1. The ALUs column 53, the multiply column 57, the divide column 58, and the branch execution unit column 59 correspond to the plurality of functional units 75 of FIG. 1. The load-port ports column 56 corresponds to the load-store unit 80 of FIG. 1. The load instructions are issued from the instruction issue unit 55 with the expectation of data being in the data cache 85 (data cache hit). In one embodiment, when the data is not present in the data cache 85, then the load instruction changes the write time in the register scoreboard 40 for latency time of a level-2 cache. The instructions that are dependent on the destination register of the replay load instruction are also replayed. The same procedure is used for replaying instructions, the new replay read time, replay execute time, and replay write time must check the time-resource matrix 50 for availability of resources. The replay instructions are statically scheduled for execution with the same procedure as issued instructions. In one embodiment, second sets of read buses, write buses, ALUs, and BEU are used as replay read buses 151, replay write buses 152, replay ALUs 153, and replay BEU 159, respectively, for replay instructions to avoid conflict with the issued instructions. The load/store ports 56, multiply unit 57, and divide unit 58 are shared between the issue and replay instructions. In another embodiment, the read buses 51, the write buses 52, the ALUs 53, and the BEU 59 are shared by both the issue and replay instructions.

FIG. 3 also shows an example of the information in the time-resource matrix 50. Shown is data with a read time count of 24, an execution time count of 25, and a write time count of 25. When an instruction accesses the time-resource matrix 50 for availability of resources, the matrix 50 shows that at read time 24, 1 read bus is busy, at execution time 25, 2 ALUs, 1 load-store port, 1 multiply unit, and 1 BEU are taken for execution of previous instructions, and at write time 25, 2 write buses are busy. In one embodiment, the numbers of read buses, write buses, ALUs, load/store ports, multiply unit, divide unit, and BEU are 4, 4, 3, 2, 1, 1, and 1, respectively. If an add instruction with 2 source registers and 1 destination register is issued with read time of 24, execution time of 25, and write time of 25, then the number of read buses 51 at time 24, write buses 52 at time 25, and ALUs 53 at time 25 are incremented to 3, 3, and 3, respectively. The source registers of the add instruction will receive data from read buses 2 and 3, ALU 3 is used for execution of the add instruction and write bus 3 is used to write back data from ALU 3. The counts in the row are reset by the time count. As illustrated in FIG. 3, when the time count is incremented from 14 to 15, all resource counts of row 14 are reset. All resource counts of row 15 are reset when the count is incremented to 16 in next cycle. In the embodiment of FIG. 3 resources are assigned to the issued instruction in-order of the resource count. If an issued instruction is a multiply instruction with execution time of 25, since there is only one multiply unit 57, the issued instruction cannot be issued for execution time of 25. In another embodiment, two read times, two execution times, and two write times are used per instruction with expectation that one set of times is free of conflict, increasing the chance for instruction issuing. In another embodiment, the counts indicate the number of available resources. The resource counts are decremented if the resource is assigned to an issue instruction.

FIG. 3 also shows another example of replaying an instruction in the time-resource matrix 50, which will occur in the event of a cache miss. Shown is data for an add instruction with a replay read time count of 26, a replay execution time count of 27, and a replay write time count of 27. In most cases, one source operand is read from register file 60 and one source operand of an instruction is replayed. The replay add instruction would need 1 read bus, 1 ALU, and 1 write bus to replay the add instruction at a specific time. The time-resource matrix 50 shows 1 read bus, no write bus, and 1 ALU are busy at the set time for the add instruction so the second read bus, the first write bus, and the second ALU are assigned to the replay add instruction. Since the read buses, write buses, ALUs, and BEU are frequently used, the implementation is simpler by duplicating these resources. The shared resources such as the load/store ports, multiply unit, and divide unit are more expensive in chip area to copy. The foregoing is merely one example. Replay of an instruction may occur in other circumstances such as in a bank conflict when two loads access the same data bank of a data cache, errors in the data cache to permit extra cycles to correct a 1-bit error, a level-1 TLB miss, and in instructions that are dependent on a delayed load.

FIG. 3 also shows another example of sharing a functional unit 75 with a coprocessor 100 in the time-resource matrix 50 in FIG. 1. The example in this case is sharing of the integer multiply unit in column 57 between the main CPU pipeline of microprocessor 10 and the coprocessor 100. Shown is the coprocessor 100 accessing the time-resource matrix 50 at coprocessor execution time 26. Either the instruction in the main CPU pipeline or the coprocessor instruction in the coprocessor 100 can set the count for the multiply 57. The time count concept, static scheduling method, and the time-resource matrix 57, sharing of a functional unit 75 with a coprocessor 100 or instruction replaying is fairly simple. The coprocessor 100 can dispatch the coprocessor instruction from its own execution queue (not shown), schedule to read source operand data from its own register file 160 to the functional unit 75, and schedule to write back data to destination registers of the register file 160. In another embodiment, the coprocessor 100 dispatches the coprocessor instruction to the execution queue 70 instead of its own execution queue.

In one embodiment, a resource type can be split up to permit scalability of a multi-issue processor to issue multiple instructions in a single cycle. A number of resources is dedicated to an instruction or a group of instructions. For example, the resources are dedicated to at most 2 instructions, i.e., 3 read buses are shared by 2 instructions. In FIG. 3, for a four-issue processor, the read buses 51 becomes 2 sets of 3 read buses and the first set is dedicated for the first 2 instructions and the second set is dedicated for the second 2 instructions. In another embodiment, the number of resources can be unevenly split such as the read buses 51 consists of 2 read buses dedicated to the first instruction and 3 read buses dedicated to the last 2 instructions in a three-issue processor. Yet in another embodiment, each type of resource is independently split between the instructions based on resource requirement of the instruction. The instruction has 2 source operands and 1 destination operand, so the grouping of the write buses 52 can be different, i.e., 2 write buses are dedicated per 3 instructions.

In one embodiment, each resource represented in the time-resource matrix 50 is implemented as an independent register file where the number of entries is the same as the time counter 90, and each entry consists of a resource count. The issue or replay instruction accesses individual resources as needed, instead of accessing all resources in the time-resource matrix.

The availability of all resources for the required times are read by the instruction issue unit 55 from the time-resource matrix 50 and sent to the instruction issue unit 55 for a decision of when to issue an instruction to the execution queue 70. If the resources are available at the required times, then the instruction can be scheduled and sent to the execution queue 70. The issued instruction updates the register scoreboard 40 with the write time and updates the time-resource matrix 50 to reduce the available resource values. All resources must be available at the required time counts for the instruction to be dispatched to the execution queue 70. If all resources are not available, then the required time counts for the instruction in question are incremented by one, and the time-resource matrix 50 is checked as soon as the same cycle or next cycle. The particular number of read buses 66, write buses 68, and functional units 75 in FIG. 1 is preferably chosen to minimize stalling of instructions in the instruction issue unit 55.

Figure 4:
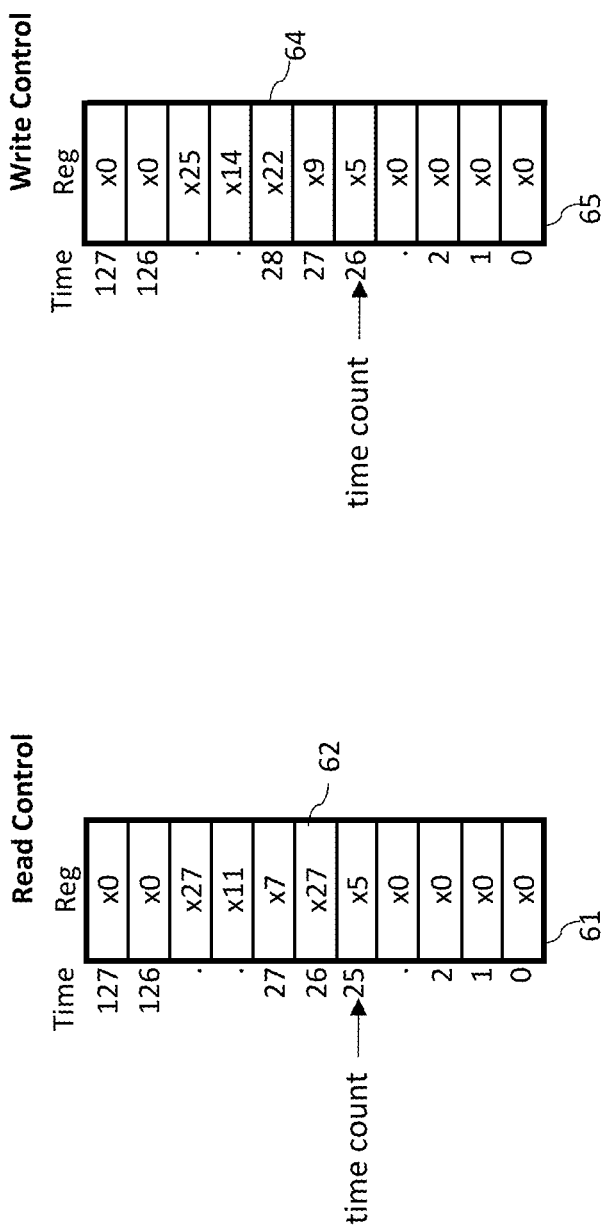
FIGS. 4A and 4B are block diagrams illustrating a read bus control and a write bus control.

FIG. 4A illustrates a single read bus of the read control unit 62 and FIG. 4B a single write bus of the write control unit 64. The read control unit 62 and the write control unit 64 include a number of time entries to match the time counter 90. As mentioned above, in a preferred embodiment the time count is incremented every clock cycle. The columns in the read control unit 62 represent the source register 61. The column in the write control unit 64 represents the destination registers in the write bus 65. In one embodiment, microprocessor 10 uses the RISC-V instruction set architecture. In that architecture register 0 (x0) is not a real register; reading of register x0 returns 0 and writing to register x0 is ignored. The x0 register is used as an invalid read and write to the register file 60. If a different instruction set architecture is used, then the read control unit 62 and the write control unit 64 can include another column of valid bits (not shown) to indicate a valid read or write, respectively. As illustrated in FIGS. 4A and 4B, when the time count is incremented from 25 to 26, the register fields 61 and 65 of row 25 will be reset to x0. The register fields 61 and 65 of row 26 are reset to x0 when the count is incremented to 27 in next cycle. FIGS. 4A and 4B show a single read bus 66 and a single write bus 68, respectively. If, however, 4 read buses and 3 write buses are implemented, then FIGS. 4A and 4B are duplicated 4 times and 3 times, respectively.

In the example illustrated in FIG. 4A, at the time count of 25 the register x5 from the register field 61 of the read control 62 is used to read the entry 5 from the register scoreboard 40 for the valid bit 42, the "Funit" 44, and the write time 46. If the valid bit 42 is set and the write time 46 is equal to the time count 90, then the data is forwarded from the "Funit" 44 instead of reading from the register file 60. If the valid bit 42 is reset, then the data is read from the register file 60. If the valid bit 42 is set, and the write time 46 is greater than the time count 90, then the instruction is replayed where the write time 46 is the read time for the replay instruction. The replay instruction will access the time-resource matrix 50 to reissue the instruction to the replay execution queue. In the next cycle, when the time count is 26, the register x27 from the register field 61 is used to read from the register file 60. The read control unit 62 is responsible for supplying the source operand data on a specific one of the read buses 66. The execution queue 70 keeps the information of which one of the read buses 66 is to receive source operand data. The execution queues 70 and read control unit 62 are synchronized based on the time-resource matrix 50. The read control unit 62 provides centralized control for the read buses 66, thus reducing complexity from the hundreds of instructions in dynamic scheduling. Similarly, in FIG. 4B, the register x5 from the register field 65 of the write control unit 64 at time count of 26 is used to write to the register file 60. The register x5 will also access the "Funit" 44 of the register scoreboard 40 to get the result data from a specific functional unit 75. Again, the execution queues 70, the functional units 75, and the write control unit 64 are synchronized to transfer result data on a write bus 68 to write to the register file 60. The write control unit 64 is the centralized control for the write buses 68 which removes complexity compared to the plurality of functional units in dynamic scheduling.

Figure 5:
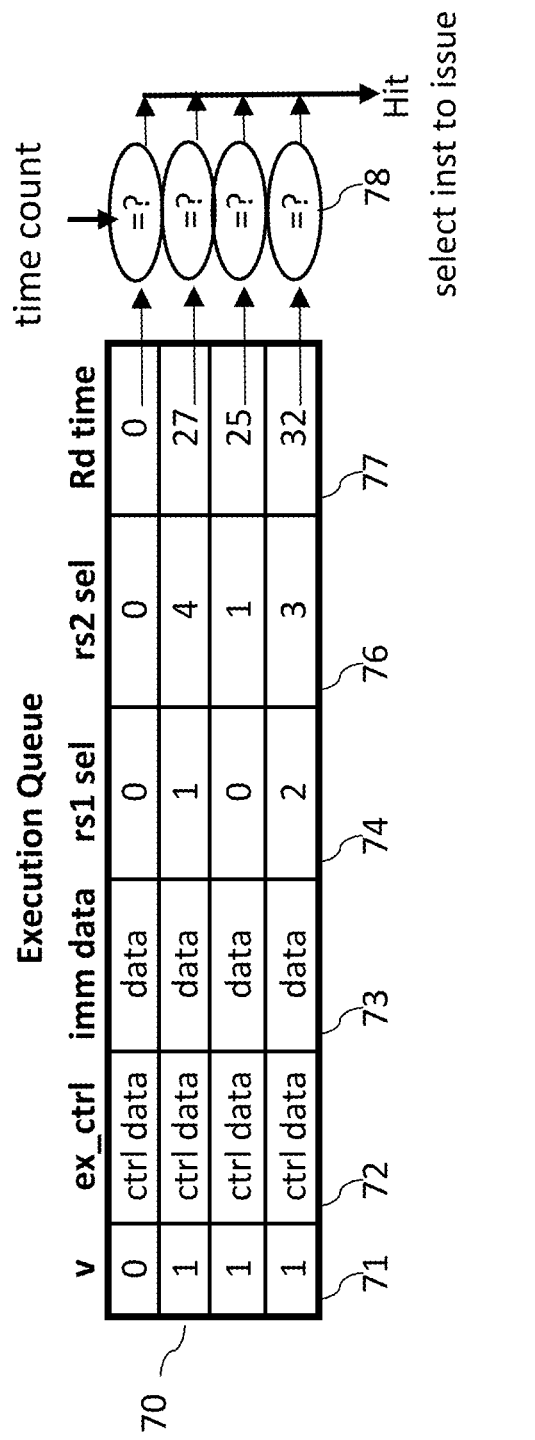
FIG. 5 is a block diagram illustrating an execution queue.

FIG. 5 illustrates an example of a 4-entry execution queue 70. The number of entries for the execution queue 70 is only an illustration. The invention is not limited to any number of execution queue 70 entries and the execution queue 70 could take the form of a single-entry execution queue. Each entry is an instruction waiting for execution by one of the functional units 75 or the load/store unit 80 according to the time count in the read time column 77. Each entry in the execution queue 70 preferably consists of the following fields: the valid bit 71, control data 72, the immediate data 73, the first source register select 74, the second source register select 76, and the read time 77. The valid bit 71 indicates that the entry is valid in the execution queue 70. The control data 72 specifies the specific operation to be used by the functional units 75 or the load/store unit 80. The immediate data 73 is an alternative to the second source register for the instruction. The valid indication for the immediate data 73 may be included in the control data field 72. Most instructions have an option to use immediate data 73 instead of data from the second source register. The first source register select 74 identifies which one of the read buses 66 has the operand data for the first source register. The second source register select 76 identifies which one of the read buses 66 has the operand data for the second source register. The source register selects 74, and 76 may not be used for some instructions.

Note that the destination register can be but does not need to be kept with the instruction. The write control unit 64 is responsible for directing the result data from a functional unit 75 to a write bus 68 to write to the register file 60. The execution queues 70 are only responsible for sending instructions to the functional units 75 or the load-store unit 80. The read time field 77 which has the read time of the instruction is synchronized with the read control unit 62. When the read time 77 is the same as the time count 90 as detected by the comparators 78, the instruction is issued to the functional units 75 or the load/store unit 80. For the example in FIG. 5, the entries are issued to the functional units out-of-order. The read time field 77 indicates that the second entry is issued at time count 25, the third entry is issued at time count 27, and the first entry is issued at time count 32.

In an embodiment, each functional unit 75 has its own execution queue 70. In another embodiment, an execution queue 70 dispatches instructions to multiple functional units 75. In this case, another field (not shown) can be added to the execution queue 70 to indicate the functional unit number for dispatching of instructions.

Referring back to FIG. 1, the execution queues 70 are coupled to the load store unit (LSU) 80 and the functional units 75. The execution queues 70 issue the instructions to the functional units 75 or the load/store unit 80 when the read times 77 are the same as the time count 90. If the instruction is a load/store, then it is dispatched to the LSU 80, else it is dispatched to one of the functional units 75. The LSU 80 and functional units 75 are also coupled to the read buses 66 and write buses 68 to access the register file 60. The source operand data are fetched from register file 60 and transported on read buses 66 to the LSU 80 and functional units 75. The result data from the LSU 80 and functional units 75 are transported on write buses 68 to write to destination registers in the register file 60. The LSU 80 is also coupled to the data cache 85. The LSU 80 executes the load and store instructions to read and write data from the data cache 85. If the data are not in the data cache 85, then the cache miss causes that cache line to be fetched from external memory (not shown). Typically, the functional units 75 perform different operations, e.g., ALU, multiply, divide, branch, etc. In other embodiments, the functional units 75 perform the same function, for example, multiple ALUs. The invention is not limited to integer functional units. In other embodiments the functional units include floating point units, digital-signal processing units, vector processing units, or custom designed units.

The foregoing explanation described features of several embodiments so that those skilled in the art may better understand the scope of the invention. Those skilled in the art will appreciate that they may readily use the present disclosure as a basis for designing or modifying other processes and structures for carrying out the same purposes and/or achieving the same advantages of the embodiments herein. Such equivalent constructions do not depart from the spirit and scope of the present disclosure. Numerous changes, substitutions and alterations may be made without departing from the spirit and scope of the present invention.

Although illustrative embodiments of the invention have been described in detail with reference to the accompanying drawings, it is to be understood that the invention is not limited to those precise embodiments, and that various changes and modifications can be affected therein by one skilled in the art without departing from the scope of the invention as defined by the appended claims.

What is claimed is:

1. A processor comprising:
a time counter storing a time count representing a current time of the processor, wherein the time count is incremented periodically to count to a maximum time count;
at least one time-resource register, having a number of entries wherein the number of entries equals the maximum time count, wherein each entry of the plurality of entries indicates an available resource count wherein a maximum value of the resource count is a total number of a type of a resource;
an instruction issue unit coupled to the time counter for receiving a first instruction, and issuing the first instruction with a preset execution time based on the time count, providing that the resource count of a time-resource register indicates available resources at the preset execution time, but stalling the first instruction if any resource required by the first instruction is not available at the preset execution time; and
an execution queue coupled to the time counter and the instruction issue unit to receive the first instruction from the instruction issue unit, and dispatch the first instruction to a functional unit when the preset execution time corresponds to the time count.

2. A processor as in claim 1 wherein:
the processor includes a clock circuit, and the time counter increments the time count with each clock cycle of the clock circuit.

3. The processor of claim 2 wherein:
the time counter comprises an N-bit counter which counts from a zero count to an Nth-bit count value, which represents a largest future time for the instruction issue unit to issue an instruction; wherein
the N-bit counter returns to the zero count after reaching the Nth-bit value.

4. The processor of claim 3 further comprising a register scoreboard storing a write time of a register in a register file, and the write time is a future time of the time count.

5. The processor of claim 4 further comprising an instruction decode unit coupled to the register scoreboard, wherein the instruction decode unit reads at least one write time for source operands of an instruction from the register scoreboard, and uses the at least one write time to determine an execution time for the instruction.

6. The processor of claim 5 wherein a time-resource matrix unit comprises a plurality of the time-resource registers for storing information relating to available resources for each time count of the N-bit time counter, and wherein the time-resource registers store information for resources that include at least one of: a plurality of read buses, a plurality of write buses, and a plurality of each type of functional units.

7. The processor of claim 6 wherein a plurality of resources of the same type is split into multiple sets of single or plurality of resources wherein each set of resources is dedicated to an instruction or multiple instructions.

8. The processor of claim 6, wherein the time-resource registers store information for resources that further include at least one of: a plurality of replay read buses, a plurality of replay write buses, and a plurality of each type of functional units, and wherein the time-resource matrix unit further checks availability of the replay read buses, the replay write buses, and the functional units for issuing a first replay instruction at a preset execution time.

9. The processor of claim 6, wherein the time-resource registers include a field to indicate a shared resource wherein the field can be read and incremented by the instruction issue unit, a coprocessor, or by replay of an instruction.

10. The processor of claim 2 further comprising a read control unit having registers storing time count entries specifying when operands may be read and transported on a read bus, and wherein the read control unit further accesses a register scoreboard to determine availability of a first register in a register file, wherein if a write time that indicates when data is to be written to the first register is the same as the time count data is forwarded from the first register instead of being read from a second register the register file.

11. The processor of claim 10 further comprising a write bus control unit having a write bus control registers storing time count entries specifying when result data may be transported on a write bus and written to a third register of the register file, and wherein the write bus control unit further accesses the register scoreboard to clear a valid bit if the write time stored in the write bus control register is the same as the time count.

12. The processor of claim 11 wherein the execution queue stores a plurality of instructions, and each instruction includes a read time which is represented by a future time count wherein the execution queue dispatches instructions to at least one functional unit.

13. The processor of claim 12 wherein the read control unit is synchronized with a read time in the execution queue.

14. A processor comprising:
a clock circuit;
a time counter storing a time count representing a specific time of operation of the processor, wherein the time count is incremented by the clock circuit;
a time-resource matrix coupled to the register scoreboard and the time counter for storing information relating to available resources for each time count of the time counter, and
an instruction issue unit coupled to the time counter for receiving a first instruction, and issuing or stalling the first instruction based on availability of the available resources from the time-resource matrix at a preset execution time based on the time count; and
an execution queue coupled to the time counter and the instruction issue unit to receive the first instruction from the instruction issue unit, and dispatch the first instruction to a functional unit when the preset execution time matches the time count;
a register scoreboard storing a write time of a selected register from a plurality of registers in a register file, wherein the write time is a future time specified by the time count;
an instruction decode unit coupled to the register scoreboard, the instruction decode unit reading a write time for each source operand of the first instruction from the register scoreboard, and using the write times corresponding to the first instruction to determine an execution time for the first instruction; and
wherein the available resources include at least one of a plurality of read buses, a plurality of write buses, and a plurality of functional units.

15. A method implemented in a processor, the method comprising:
issuing an instruction to an execution queue or stalling execution of the instruction in an instruction issue unit; and
executing the instruction at a future time depending on the availability of resources specified in a time-resource matrix, wherein the future time is a time defined by a time count from a time counter, which is incremented with each clock cycle of a clock circuit.

16. The method of claim 15 wherein the time counter provides a maximum time count corresponding to a latest future time to issue an instruction.

17. The method of claim 16 further comprising storing a write time of a first register of a register file wherein the write time is a future time defined by the time count.

18. The method of claim 17 further comprising storing information corresponding to available resources for each time count in the time-resource matrix, wherein the resources comprise at least one of a plurality of read buses, a plurality of write buses, and a plurality of functional units.

19. The method of claim 18 further comprising storing information corresponding to available resources for an instruction or instructions and to another available resources of the same type for another instruction or instructions.

20. The method of claim 19 further comprising storing in a register of a read control unit a read time that specifies when data may be read from the register file and transported on a read bus.

21. The method of claim 20 further comprising storing in a register of a of a write control unit a write time that specifies when result data may be transported on a write bus and written to a second register of the register file.

22. The method of claim 15 further comprising storing a plurality of instructions in an execution queue, wherein each instruction includes a read time defined by the time count.

23. The method of claim 22 further comprising synchronizing the read time of the execution queue with the read control unit.

24. The method of claim 20, wherein the execution queue dispatches instructions to at least one functional unit.

* * * * *